United States Patent [19]

Wahl et al.

[11] 4,273,237

[45] Jun. 16, 1981

[54] DEVICE FOR FEEDING CONTAINERS, ESPECIALLY BOTTLES, TO PROCESSING MACHINES, ESPECIALLY CONTAINER CLEANING MACHINES

[75] Inventors: Alois Wahl; Paul Elsner, both of Bad Kreuznach, Fed. Rep. of Germany

[73] Assignee: Seitz-Werke GmbH, Bad Kreuznach, Fed. Rep. of Germany

[21] Appl. No.: 36,292

[22] Filed: May 7, 1979

Related U.S. Application Data

[63] Continuation of Ser. No. 784,251, Apr. 4, 1977, abandoned.

[30] Foreign Application Priority Data

Apr. 6, 1976 [DE] Fed. Rep. of Germany ....... 2614711

[51] Int. Cl.[3] .............................................. B65G 47/12

[52] U.S. Cl. .................................... 198/445; 198/817; 198/839

[58] Field of Search ............... 198/445, 443, 426, 427, 198/432, 434, 447, 817, 857, 839, 600

[56] References Cited

U.S. PATENT DOCUMENTS 3,710,918 1/1973 Babunovic ........................... 198/445

FOREIGN PATENT DOCUMENTS 1110794 4/1968 United Kingdom ..................... 198/443

*Primary Examiner*—Jeffrey V. Nase
*Assistant Examiner*—Douglas D. Watts
*Attorney, Agent, or Firm*—Becker & Becker, Inc.

[57] ABSTRACT

A device for feeding containers to a magazine table equipped with shelving and pertaining to a container delivery of processing and wrapping machines, especially of bottle cleaning machines. The device includes an endless conveyor belt passing by the shelving of the magazine table, and also includes devices, e.g. guiding plates, for exerting a lateral guiding pressure upon the containers accumulated in front of the shelving, the guiding pressure being directed toward the entrances to the shelving. The conveyor belt is so arranged with regard to the direction of introduction of the containers into the shelving of the magazine table that the feeding direction of the conveyor belt forms an obtuse angle with the direction of introduction of the containers into the shelving of the magazine table.

9 Claims, 3 Drawing Figures

DEVICE FOR FEEDING CONTAINERS, ESPECIALLY BOTTLES, TO PROCESSING MACHINES, ESPECIALLY CONTAINER CLEANING MACHINES

This is a continuation of application Ser. No. 784,251-Wahl et al filed Apr. 4, 1977, now abandoned.

The present invention relates to an apparatus for feeding containers to a magazine table which is equipped with shelving and pertains to a container receiving device of treatment or wrapping machines, especially bottle cleaning machines. More specifically, the present invention relates to an apparatus of the above mentioned type which is provided with a conveyor belt passing by said shelving and comprising means for instance a guiding plate, for exerting a lateral guiding pressure upon the containers collected in front of the entrance to said shelving, said guiding pressure being directed upon the entrance of said shelving.

With feeding apparatuses of the above mentioned type which are also known as "crowded charge", it is known to have a conveyor belt pass by the entrance to said shelving at a substantially right angle to said entrance, and furthermore above said conveyor belt to arrange yieldable, especially resilient guiding devices at an incline so that the containers fed by said conveyor belt to the entrance of said shelving will resiliently and yieldably be crowded into the entrance to the shelving. In this connection, it is known along the row of entrance of the shelving to provide a plurality of guiding plates which at an incline extend over the conveyor belt. These guiding plates are pivotable out of the region of the conveyor belt against the spring effect by the containers fed by the conveyor belt. However, in this connection, said guiding plates always exert a pressure against the supplied container in order to crowd the same into the entrance of the shelving (see German Offenlegungsschrift No. 14 32 358). Inasmuch as with such crowded charging it easily happens that containers are placed against the end face edge of the walls of the shelving, whereby the entrance to the shelving is blocked, it has become known to move back and forth walls of the shelving or a bottom guiding plate arranged in front of the entrance to said shelving, in conformity with German Pat. Nos. 11 49 630 and 10 09 517. With all heretofore known apparatuses of this type, there exists the drawback that the containers within the region of the crowded charge push against each other and exert a friction upon each other. Aside from the unfavorably occurring damage to the containers, it will be appreciated that at the heretofore known crowded charging stations, considerable noise is generated by the containers pushing against each other and exerting a friction upon each other.

It is, therefore, an object of the present invention to provide an apparatus of the above mentioned type, in which the transgression of the containers from the conveyor belt to said shelving will be greatly facilitated so that the lateral pressure to be exerted onto the container for a crowded charging, can be considerably reduced in order to reduce the mutual collission and friction of the containers to a major extent and thereby also to considerably reduce the generation of noise.

The objects and other objects and advantages of the invention will appear more clearly from the following specification in connection with the accompanying drawings, in which.

Figure 1:
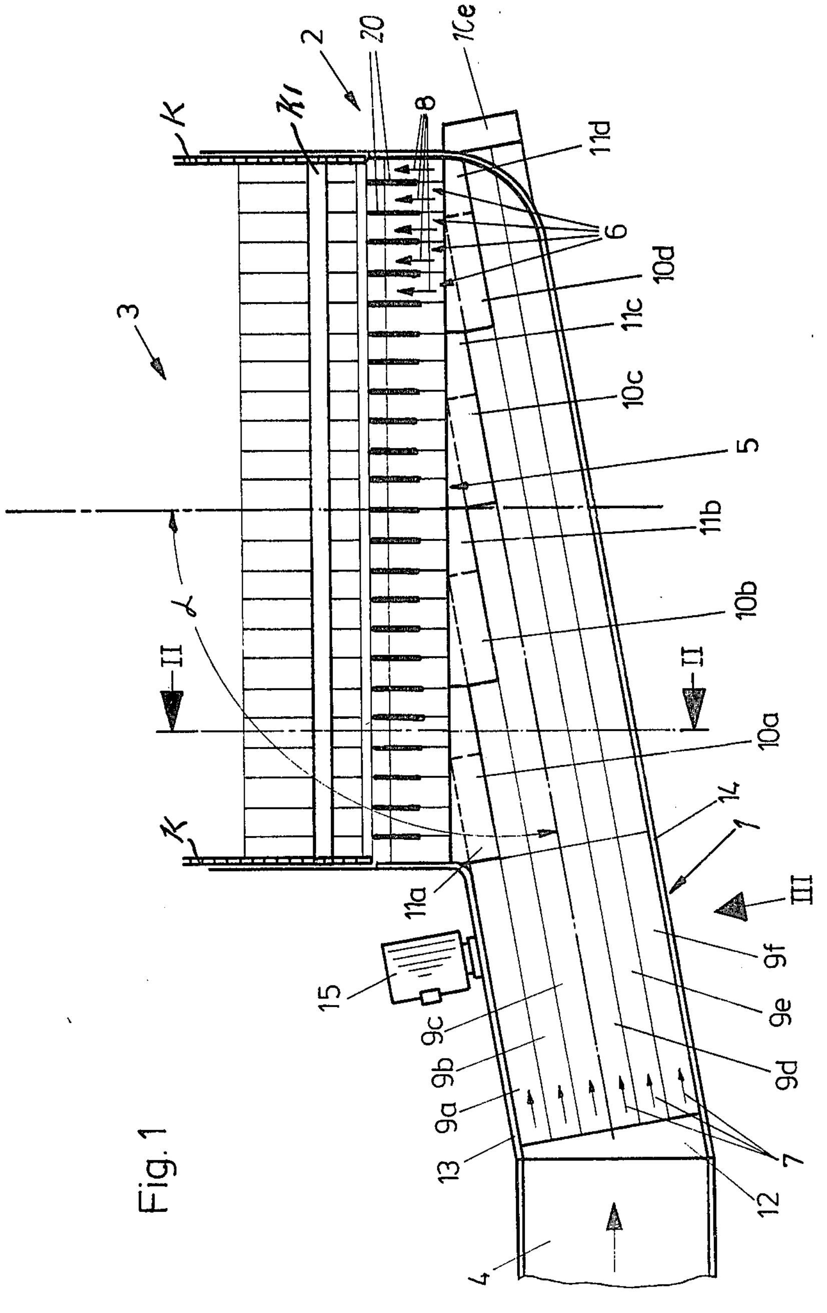
FIG. 1 shows a top view of a charging apparatus according to the invention.

The apparatus according to the present invention is characterized primarily in that the conveyor belt with its conveying device is placed at an obtuse angle to the feeding direction into the shelving. In view of this feature, the oncoming containers are already provided with a more or less great component of movement in the feeding direction into the shelving so that the containers when hitting the face edge of a wall of the shelving can be caught with their component of movement extending transverse to the feeding-in direction, while having the tendency with their component of movement extending in feeding-in direction into the shelving to enter the entrance to the shelving from where they can then immediately be caught by transporting devices arranged in said shelving. In this way, the accumulation in front of the entrance to the shelving as it is heretofore customary for crowded charging will be considerably reduced.

As has been discovered, within the framework of the present invention a relatively slight deviation from the heretofore rectangular arrangement of the conveying direction of the conveying belt will suffice for the entering direction into the shelving. For instance, the obtuse angle of incidence of the conveying device of the conveyor belt for the entering direction into the shelving may amount to about 95°.

The invention is of particular advantage when the entries into the shelving are located along one line. In such an instance, the conveyor belt with its conveying direction should have an acute angle of incidence with regard to the front of the entries into the shelving. In this way, the containers moved by the conveyor belt to the entries of the shelving will no longer be passed by the entries of the shelving as was done heretofore but are at an acute angle conveyed to the entries toward the shelving. Also in this instance already a relatively small angle of for instance 5° will suffice in order to obtain a considerable improvement in feeding the containers into the entries to the shelving.

Normally, the introducing direction into the shelving will be selected substantially at a right angle to the aligned entries to the shelving. However, the above mentioned advantages of the invention may also be realized when the introducing direction into the shelving is not at a right angle to the alignment of the shelving entries.

According to the preferred embodiment of the invention, the transporting belt is formed by a plurality of parallel guided component belts which are passed over deviating stations which are staggered along the side to be positioned with regard to the magazine table and are covered by a cover plate at the curved regions of said belts. In this way, the feeding device in spite of the inclined placement of the conveyor belt relative to the magazine table obtains a substantially rectilinear engaging edge and that the transfer of the containers can be effected from the conveyor belt to the shelving by means of a simple cover plate. The design of the component belts brings about the advantage that if desired these component belts can be operated at different feeding speeds. For instance, the component belts which extend further from the side of the magazine table against which they are to be placed can be driven at a higher feeding speed than those component belts which are closer to said side. These different advancing speeds will bring about that in an accumulation of containers occurring in front of the entrances to the shelving, there will be generated a type of turbulence or torque by means of which there will be further aided the component of movement imparted from the start upon the containers in the entrance direction toward the shelving. The drive of the conveyor belt can within the framework of the invention be particularly simple and may for instance consist of an infinitely variable drive which acts upon the returning section of the belt. This infinitely variable drive may be common for all component belts. If, as mentioned above, it is intended to respectively drive the component belts at different advancing speeds, it is possible for the individual component belts to provide exchangeable driving rollers of different sizes or diameters which are connected to a common drive.

Figure 2:
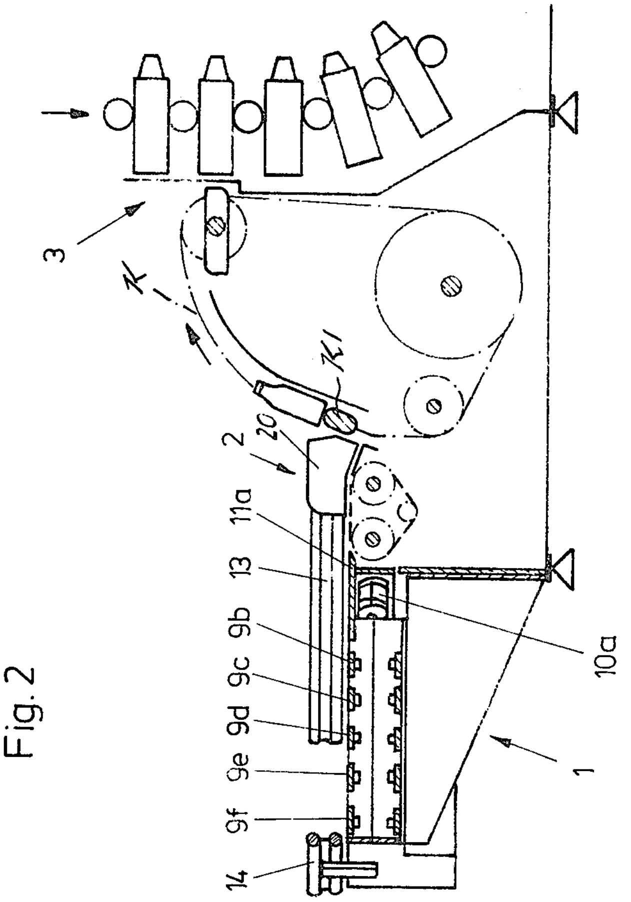
FIG. 2 represents a section taken along the line II—II of FIG. 1.

Referring now to the drawings in detail, the arrangement shown therein concerns a feeding device 1 to the delivery-urging magazine table 2 of a bottle cleaning machine 3 having a conveyor system including chains K with a follower K1 (see FIGS. 1 and 2) for instance leading to the bottle cleaning machine. The bottles to be cleaned are first transported by a conveyor belt 4 which, in the illustrated example is parallel to the straight line or alignment 5 of the magazine entrances 6. The feeding device 1 is, however, placed at an obtuse angle $\alpha$ indicated by the arrows 7 relative to the introducing device indicated by the arrows 8 which feeds the bottles into the space between parallel partitions 20 forming the shelving or compartments of the magazine table 2. The obtuse angle $\alpha$, in the specific illustrated example in the drawing, amounts to about 95°. As will be evident from FIG. 1, the conveyor belt of the feeding transporting device 1 is formed by a plurality of component belts 9*a*, 9*b*, 9*c*, 9*d*, 9*e*, 9*f* which in the illustrated example are all driven at the same feeding speed in the direction indicated by the arrows 7.

The deviating stations 10*a*, 10*b*, 10*c* and 10*d* of the component belts 9*a*, 9*b*, 9*c* and 9*d* are staggered along that side of the feeding device 1 which is to be placed against the magazine table 2. The component belts 9*e* and 9*f* in the illustrated example have a common deviating station 10*e* which, however may, if desired, likewise be staggered relative to the deviating station 10*d*. At their curved region in the respective deviating station, the component belts 9*a*, 9*b*, 9*c* and 9*d* are covered by a cover plate 11*a*, 11*b*, 11*c* and 11*d*. These cover plates are adjustable as to height in any suitable manner and are stepped in conformity with the component belts and their deviating stations. By means of these cover plates 11*a*, 11*b*, 11*c* and 11*d*, the bottles are caused smootly to transfer from the component belts 9*a*–9*f* to the shelving or compartments of the magazine table 2. For securing a smooth transfer of the bottles from the conveyor belt 4 onto the component belts 9*a*–9*f*, there is provided a transfer piece 12 in the form of a slide plate. At both sides, the feeding path of the feeding device 1 is provided with guiding elements, for instance guiding strips or guide rails 13 and 14, of which in particular the outer guiding rail 14 engages the magazine table 2 along a curved section.

The drive of all component belts 9*a*–9*f* is effected by means of a common driving device with an infinitely variable drive means including motor 15, drive shaft 16, driving roller 17 and tensioning rollers 18. As will be evident from FIG. 3, the motor 15 drives a drive shaft 16 which engages the returning section of the component belts 9*a*–9*f*. This driving shaft 16 extends transverse over that portion of the feeding device 1 which moves away from the magazine table 2 so that the driving device is arranged completely outside the range of the bottle feeding machine 3 and its magazine table 2.

Figure 3:
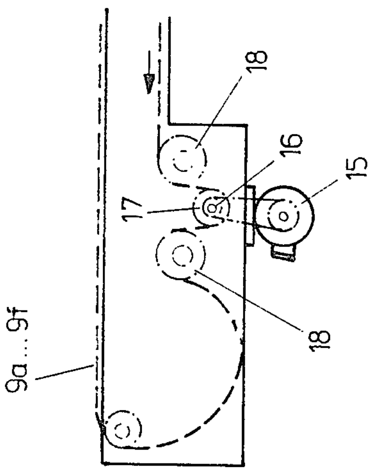
FIG. 3 is a partial view seen in the direction of the arrow III of FIG. 1.

As will furthermore be seen from FIG. 3, an exchangeable driving roller 7 is mounted on the driving shaft 16 for each of the component belts 9*a*–9*f*. In order to improve the engagement between the driving roller 17 and the respective component belt 9*a*–9*f*, tensioning rollers 18 are arranged at both sides of the driving shaft 16. If it is desired to drive the component belts 9*a*–9*f* at different feeding speeds, this may be realized simply by a selection of driving rollers 17 of different sizes operatively connected to the drive in common therewith.

As will be seen from the above, with the driving motor 15 turned on, a flow of bottles introduced by the conveyor belt 4 and the transfer from the latter by the slide plate 12 onto the component belts 9*a*–9*f*, is conveyed to the magazine table 2. In this connection, the bottles pass at an acute angle of approximately 5° to the cover plates 11*a*–11*d* to the magazine entrances 6. If thereafter the feeding device 1 is filled with bottles, the newly arriving bottles will, while avoiding disadvantageous bridge formations, crowd the bottles in front of the magazine entrances 6 into the latter where they will be taken over by non-illustrated transporting devices associated with the magazine table 2 and will be fed to the bottle cells of the cleaning machine. The pressure head or accumulating pressure exerted in this connection for pushing the bottles into the magazine entrances 6 is, in view of the component of movement directed at an acute angle to the introducing direction into the magazine entrances 6, reduced considerably. At the same time, the self-arrangement of the bottles is materially improved.

It is, of course, to be understood that the present invention is, by no means, limited to the specific showing in the drawings, but also comprises any modifications within the scope of the appended claims.

What we claim is:

1. Apparatus for feeding containers to a magazine table having a plurality of entrance paths separated by parallel partitions, said apparatus including a conveyor belt arranged at an obtuse angle to said front side of said magazine table and at an acute angle to said paths, to deliver containers to said magazine table, said conveyor belt being formed by a plurality of component belts for delivering containers to said magazine table, the front side of said magazine table overlying said conveyor belt, covering plates overlying said component belts adjacent the front side of said magazine table to guide said containers from said component belts to the entrance paths between said partitions so that groups of containers conveyed by said conveyor belt are individually deflected to said entrance paths, the movement of said containers at an angle to the front side of said magazine table exerting a component of force toward said table to direct said containers into said paths.

2. A container conveying apparatus in which a linear conveying means conveys bottles to shelving in which the bottles are moved in linear rows, comprising shelving having aligned entrances of substantially the width of said bottles to receive said bottles in parallel linear rows, a linear conveyor means of a width greater than the width of each entrance, but less than the total width of said aligned entrances, leading to said entrances with the direction of travel of said linear conveyor means at an obtuse angle greater than 90° to the linear rows of bottles formed on said shelving, so that said aligned entrances extend across the linear conveyor means from side to side at an acute angle to the direction of travel of said linear conveyor means, guiding elements along the sides of said conveyor and extending to said aligned entrances to direct masses of bottles on said linear conveyor means toward said aligned entrances, and bottle deviating means overlying the end of said linear conveyor means at said aligned entrances to deflect bottles on said linear conveyor means into said entrances in parallel linear rows at an angle greater than 90° to the direction of travel of said linear conveyor means, so that the movement of said bottles on said linear conveyor means provides a component of motion of said bottles in the direction of said parallel linear rows and thereby contributes to the movement of bottles from said linear conveyor means through said entrance and in said parallel linear rows.

3. An arrangement according to claim 2, in which said obtuse angle is about 95°.

4. An arrangement according to claim 2, in which said acute angle is about 5°.

5. An arrangement according to claim 2, in which said linear conveyor means includes a plurality of substantially parallel component belts, and in which reversing stations are provided in staggered arrangement on that side of said linear conveyor means which is adjacent said entrances for reversing the direction of movement of said component belts, cover plate means being provided within the reversing region of said reversing stations and covering the curved portions of said component belts within the region of said reversing stations.

6. An arrangement according to claim 5, in which said cover plate means are located in conformity with said component belts and said reversing stations.

7. An arrangement according to claim 5, which includes means for driving said component belts at the same feeding speed.

8. An arrangement according to claim 6, in which said linear conveyor means comprises first component belts and second component belts, and in which said second component belts are spaced farther than said first component belts from that side of said linear conveyor means which is adjacent said entrances, and driving means operatively connected to said first and second component belts and operable to drive said second component belts at a higher speed than said first component belts.

9. An arrangement according to claim 3, which includes an infinitely variable drive drivingly connected to the slack section of said conveyor belt.

* * * * *